United States Patent [19]

Gunderson

[11] Patent Number: 4,471,531
[45] Date of Patent: Sep. 18, 1984

[54] METHOD AND APPARATUS FOR MEASURING PRESS ROLL CLEARANCE

[75] Inventor: Dennis E. Gunderson, Madison, Wis.

[73] Assignee: The United States of America as represented by the Secretary of Agriculture, Washington, D.C.

[21] Appl. No.: 467,068

[22] Filed: Feb. 16, 1983

[51] Int. Cl.³ .......................... G01B 5/14; G01B 7/14
[52] U.S. Cl. .................................. 33/182; 33/DIG. 8
[58] Field of Search ................ 33/147 L, 182, DIG. 8

[56] References Cited

U.S. PATENT DOCUMENTS

| | | | |
|---|---|---|---|
| 2,032,584 | 3/1936 | Lengel et al. | 33/182 |
| 2,310,262 | 2/1943 | Shields | 101/216 |
| 2,825,217 | 3/1958 | Byrd | 100/108 |
| 3,246,822 | 4/1966 | Skeen | 100/109 |
| 3,561,359 | 2/1971 | Cohen | 100/168 |
| 3,646,686 | 3/1972 | Kreiskorte | 33/182 |
| 3,670,644 | 6/1972 | Hoever et al. | 100/168 |
| 3,845,708 | 11/1974 | Liebert | 100/155 |
| 4,131,004 | 12/1978 | Eibe | 33/182 |

FOREIGN PATENT DOCUMENTS

| | | | |
|---|---|---|---|
| 826201 | 12/1951 | Fed. Rep. of Germany | 33/182 |
| 160606 | 12/1981 | Japan | 182/ |
| 170115 | 1/1960 | Sweden | 33/182 |

Primary Examiner—Richard R. Stearns
Attorney, Agent, or Firm—M. Howard Silverstein; David G. McConnell

[57] ABSTRACT

Method and apparatus for measuring the nip clearance between two rolls rotating close to each other. First and second members are non-rotatably mounted on opposite sides of the nip. Each member has a pair of wheels mounted so that one wheel rotates in contact with only one roll and the other wheel rotates in contact with only the other roll. The nip clearance is a function of the distance between the two members.

6 Claims, 5 Drawing Figures

METHOD AND APPARATUS FOR MEASURING PRESS ROLL CLEARANCE

BACKGROUND OR THE INVENTION

1. Field of the Invention

This invention relates to method and apparatus for measuring the clearance between large rolls rotating close to each other. Such rolls are commonly used in rolling, pressing, sizing, and calandering operations performed on various materials such as paper, plastics, and many others. During such operations it is often desirable to measure the nip clearance between the closely rotating rolls.

2. Prior Art

Many prior art rolling apparatus provides for adjustment of roll clearance, but fails to provide for its measurement. See, for example, U.S. Pat. Nos. 2,310,262 (Shields); 2,825,217 (Byrd); 3,246,822 (Skeen); 3,670,644 (Hoever et al); and 3,845,708 (Liebert). Prior-art apparatus that does provide for nip measurement does so by measuring the distance between roll centers or by measurement of frame members in contact with the rolls. See, for example, U.S. Pat. No. 3,561,359 (Cohen). However, thermal expansion of the rolls, worn roll bearings and/or slightly distorted frame members can cause such measurements to be inaccurate.

Hence, a method for accurately measuring the nip clearance between large rolls rotating close to each other is needed. The measurement must be accurate in spite of thermal expansion of the rolls and other distortions that frustrate prior-art measuring techniques. Nip clearance measurements should be possible even if the rolls are rotating in opposite directions or at different peripheral speeds.

SUMMARY OF THE INVENTION

One aspect of the present invention comprises apparatus for measuring the nip clearance between first and second large, closely-rotating rolls comprising:

(a) first and second members adapted to be a non-rotatably mounted on opposite sides of the nip, each of said members having a pair of small wheels rotatably mounted thereon such that when said members are mounted one wheel of each pair rotates in contact with only the first roll and the other wheel of each pair rotates in contact with only the second roll, and (b) means for measuring the distance between selected points on said members.

Another aspect of the present invention comprises a method of measuring the nip clearance between first and second large, closely-rotating rolls comprising the steps of:

(a) non-rotatably mounting first and second members on opposite sides of the nip, each of said members having a pair of wheels rotatably mounted thereon such that one wheel of each pair rotates in contact with only the first roll and the other wheel of each pair rotates in contact with only the second roll, and (b) measuring the distance between selected points on the first and second members.

DESCRIPTION OF PREFERRED EMBODIMENT

In the following description the rolls are rotating in opposite directions. However, it should be understood that the invention works equally well if the rolls are rotating in the same directions, even at different peripheral speeds.

Figure 1:
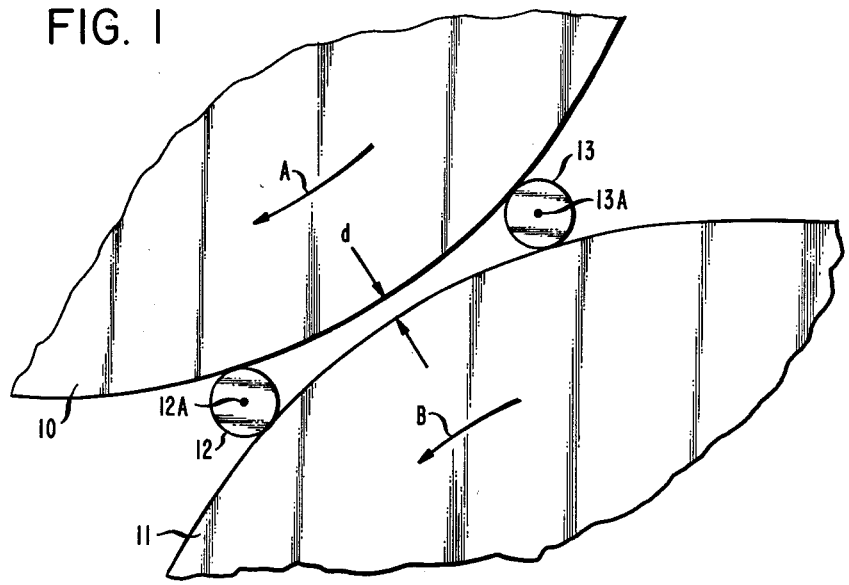
FIG. 1 illustrates gage rods that could provide accurate nip clearance measurement if the rolls were not rotating in opposite directions.

In FIG. 1 two large rolls 10 and 11 are shown rotating in opposite directions A and B. It is desirable to measure the nip clearance, dimension d, between the two rolls. If the rolls were not rotating in opposite directions, two precision diameter gage rods 12 and 13 could be placed on either side of the nip in contact with both large rolls, as shown. The nip clearance is a function of the distance between the centers 12A and 13A of rods 12 and 13. Hence this gaging system could be calibrated so that when one knows the distance between centers 12A and 13A, clearance d may be determined.

Furthermore, if the rolls 10 and 11 have much larger diameters than those of rods 12 and 13, i.e. at least 20 times larger and preferably at least 30 times larger, then a small change in the nip clearance d will cause a relatively large change in the distance between centers 12A and 13A. Furthermore, when rolls 10 and 11 are much larger than rods 12 and 13, small changes in the diameters of rolls 10 and 11 (as from thermal expansion) have a very small effect on the calibration.

Unfortunately, the gaging system of FIG. 1 will not work for oppositely rotating rolls, since rod 12 tends to be expelled from the nip, and rod 13 tends to wedge and jam between the rolls.

Figure 2:
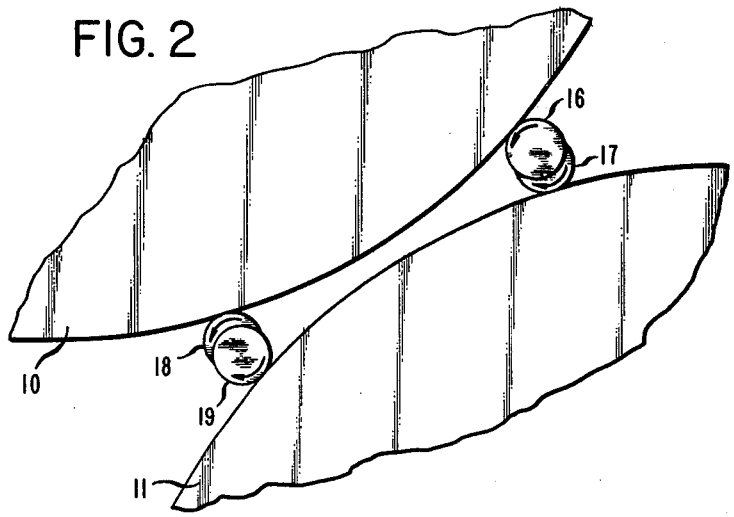
FIG. 2 is a side view of apparatus in accordance with the invention.
Figure 3:
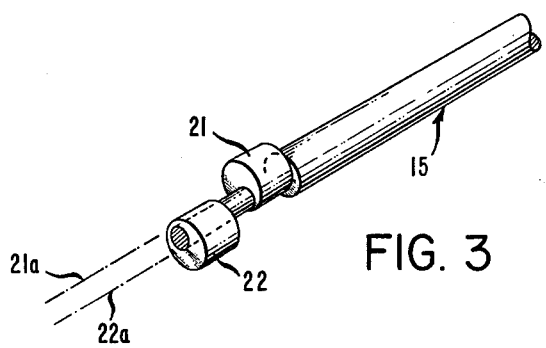
FIG. 3 is an isometric view of a shaft used with the invention.
Figure 4:
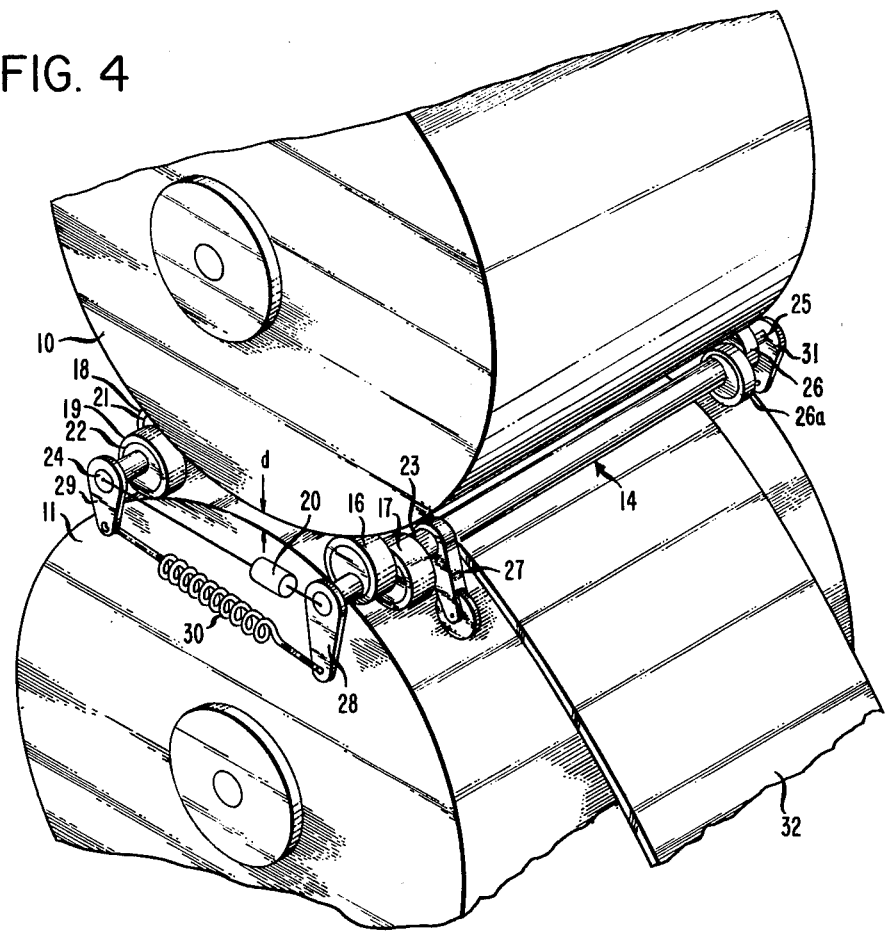
FIG. 4 is an isometric view of preferred apparatus in accordance with the invention.

FIGS. 2, 3, and 4 show, quite suprisingly, that the gaging principle illustrated in FIG. 1 can be adapted for use with rotating rolls, even if their peripheral speeds are different and/or even if they rotate in opposite directions.

First and second members 14 and 15 (FIGS. 3 and 4) adapted to be non-rotatably mounted on opposite sides of the nip are provided. The preferred non-rotatable mounting will be described presently. Second member 15, not visible in FIG. 4, is a mirror immage of first member 14.

Each member 14 and 15 has at least one pair of small wheels rotatably mounted on it. Wheels 16 and 17 are rotatably mounted on member 14, and wheels 18 and 19 are rotatably mounted on member 15. To obtain all the advantages of the gaging principle illustrated in FIG. 1, wheels 16, 17, 18, and 19 should be small in comparision to rolls 10 and 11. Preferably rolls 10 and 11 have diameters at least 20 times as large as those of the small wheels, more preferably at least 30 times as large. Each pair of wheels is mounted such that one wheel of each pair rotates in contact with roll 10. In FIGS. 2 and 4, wheels 16 and 18 rotate in contact with roll 10. The other wheel of each pair, 17 and 19 in FIGS. 2 and 4, rotates in contact with roll 11. By having one wheel from each pair rotate on contact with a different roll, the apparatus of member 15 is not expelled from its position near the nip, and the apparatus of member 14 does not wedge and jam in the nip, as would happen with the rods of FIG. 1.

Means 20 for measuring the distance between selected points on members 14 and 15 is provided. Means 20 may be a direct mechanical means (e.g. a dial indicator), a linear potentiometer, a linear variable differential transformer, or any other suitable distance-measuring device.

The preferred arrangement for mounting each pair of wheels is shown in FIG. 3. Here member 15 is a shaft having a pair of bearing surfaces 21 and 22 having different axes. Bearing surface 21 has axis 21A, and bearing surface 22 has axis 22A. Preferably the axes are parallel. When the shaft of FIG. 3 is installed as shown in FIG. 4, wheel 19 rotates on bearing surface 22 and wheel 18 rotates on bearing surface 21. Pair of wheels 16 and 17 of FIGS. 2 and 4 are mounted on a similar pair of bearing surfaces having different axes.

Preferably members 14 and 15 are elongated shafts having lengths at least about equal to the lengths of rolls 10 and 11, as shown in FIG. 4. Each shaft has a first end (end 23 of shaft 14 and end 24 of shaft 15) and a second end (end 25 of shaft 14, the second end of shaft 15 is not visible). Pair of wheels 16 and 17 is mounted on first end 23 of shaft 14. Pair of wheels 18 and 19 is mounted on first end 24 of shaft 15. Preferably a second pair of wheels (26 and 26A on shaft 14, not visible on shaft 15) are mounted on the second ends of the shafts. These wheel pairs are mounted on bearing surfaces similar to those shown in FIG. 3 so that one wheel of each pair rotates only in contact with roll 10, and the other wheel of each pair rotates only in contact with roll 11.

Any method of non-rotatably mounting members 14 and 15 on opposite sides of the nip is acceptable. The preferred mounting is illustrated in FIG. 4. Follower 27 is fixedly attached to shaft 14 near first end 23. The follower is adapted to ride in contact with roll 11, thereby preventing rotation of shaft 14. A similar follower, not shown, would be attached to the first end of shaft 15. To keep the followers and wheel pairs in contact with the rolls, lever 28 is fixedly attached to end 23 of shaft 14 outside of the rolls. Lever 29 is similarly attached to end 24 of shaft 15. The levers are pulled toward each other by tension spring 30, which forces the followers and wheel pairs into contact with the rolls. A second pair of levers connected by a second tension spring, similar to items 28, 29, and 30, is attached to the second ends of shafts 14 and 15. Only lever 31 of this arrangement is visable in FIG. 4. Of course, all of the followers and pairs of wheels should be mounted near the ends of the rolls, outside of any material 32, such as paper or plastic, being processed through the rolls.

EXAMPLE

Figure 5:
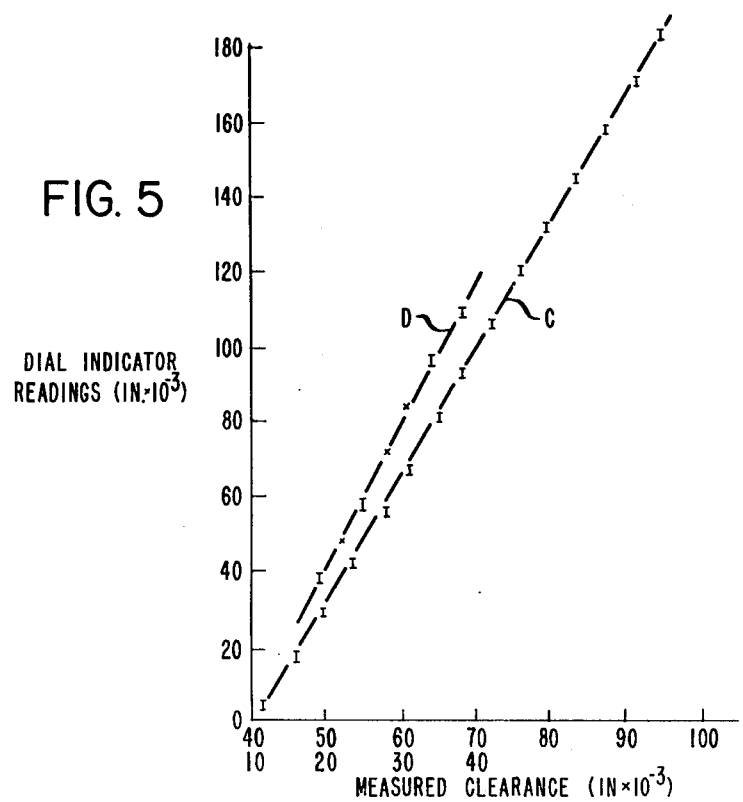
FIG. 5 is a plot of a calibration curve formed during tests of the apparatus.

Apparatus in accordance with FIG. 4 was installed on a roll press dryer having rolls with diameter of 24 inches. The small wheels had diameter of 1 inch. A dial indicator was used to measure the distance between selected points on members 14 and 15. The apparatus was calibrated using solder to provide the measurement of the actual nip clearance. That is, at each setting of nip clearance, solder was passed between the rolls several times. When a constant thickness was attained, that was considered to be the actual nip clearance. During the test the readings on the dial indicator (item 20 of FIG. 4) varied cyclicly by about 0.002 inch, indicating, perhaps that the rolls were slightly out of round. Two runs were made. During one run, the nip clearance was varied between 0.042 and 0.095". The results of this run are shown on curve C of FIG. 5. During another run the nip clearance was varied between 0.019 and 0.038". The results of this run are shown as curve D on FIG. 5. Notice that the slope of curve D is steeper than that of curve C, indicating that as the nip clearance becomes smaller, the sensitivity of the apparatus increases. Once a calibration curve, such as C or D of FIG. 5, is established, dial indicator readings can be directly related to nip clearance.

It can be seen that the present invention provides relative inexpensive apparatus for accurately measuring the nip clearance between rolls rotating in opposite directions. The apparatus can be operated while the rolls are in motion to provide a continuous measurement. If the rolls have compressable surfaces, such as rubber, the apparatus can provide a measure of the amount of interference between the roll surfaces. The measurement is accurate in spite of pansion of the rolls or distortion of the frame members holding the rolls. The invention can be used for rolls rotating in the same direction, even if the peripheral speeds of the two rolls are different.

What is claimed is:

1. Apparatus for measuring the nip clearance between first and second large, closely-rotating rolls comprising:
    (a) first and second members adapted to be non-rotatably mounted on opposite sides of the nip, each of said members having a pair of small wheels rotatably mounted thereon such that when said members are mounted, one wheel of each pair rotates in contact with only the first roll, and the other wheel of each pair rotates in contact with only the second roll, and wherein said first and second members are elongated shafts having lengths at least about equal to the lengths of the large rolls, wherein each of said shafts has a first end and a second end, wherein said pairs of small wheels are mounted on said first ends, and further comprising a pair of small wheels rotatably mounted on the second end of each shaft such that one wheel of each pair rotates in contact with only the first roll and the other wheel of each pair rotates in contact with only the second roll, and wherein said pairs of wheels are mounted on pairs of bearing surfaces having different axes, and
    (b) means for measuring the distance between selected points on said members.

2. The apparatus of claim 1 further comprising:
    a follower attached to each of said shaft near said first ends, each follower adapted to ride in contact with one of said rolls to prevent rotation of said shaft,
    a lever fixedly attached to each first end of each shaft outside of said rolls, said levers being pulled toward each other by a tension spring such that each of said followers is forced into contact with one of said rolls, and
    a lever fixedly attached to each second end of each shaft outside of the rolls, said levers being pulled toward each other by a tension spring.

3. A method of measuring the nip clearance between first and second large, closely-rotating rolls comprising the steps of:
    (a) non-rotatably mounting first and second members on opposite sides of the nip, each of said members having a pair of small wheels rotatably mounted thereon such that one wheel of each pair rotates in contact with only the first roll and the other wheel of each pair rotates in contact with only the second roll, and wherein said first and second members are elongated shafts having lengths at least about equal to the lengths of the large rolls, wherein each of said shafts has a first end and a second end, wherein said pairs of small wheels are mounted on said first ends, and wherein a pair of small wheels is rotatably mounted on the second end of each shaft such that one wheel of each pair rotates in contact with only the first roll and the other wheel of each pair rotates in contact with only the second roll, and wherein said pairs of wheels are mounted on pairs of bearing surfaces having different axes, and (b) measuring the distance between selected points on said first and second members.

4. The method of claim 3 wherein a follower is fixedly attached to each of the shafts near the first ends, the followers being adapted to ride in contact with one of the rolls to prevent rotation of the shafts, wherein a lever is fixedly attached to each first end of each shaft outside of the rolls pulled toward each other by a tension spring such that each of the followers is forced in to contact with one of the rolls, and wherein a second pair of levers are fixedly attached to the second ends of each shaft outside of the rolls pulled toward each other by a tension spring.

5. The method of claim 3 wherein the large rolls are rotating in opposite directions.

6. The method of claim 3 wherein the large rolls are rotating at different peripheral speeds.

* * * * *